United States Patent [19]

LaCoste et al.

[11] Patent Number: 4,834,133
[45] Date of Patent: May 30, 1989

[54] CONTROL VALVE

[75] Inventors: Bernard L. LaCoste, Bay Saint Louis, Miss.; Suryakant K. Dawawala, Casselberry; Robert M. Nelson, Winter Springs, both of Fla.

[73] Assignee: Westinghouse Electric Corp., Pittsburgh, Pa.

[21] Appl. No.: 250,203

[22] Filed: Sep. 28, 1988

[51] Int. Cl.⁴ .................... F16K 1/04; F16K 43/00
[52] U.S. Cl. .................... 137/315; 137/454.6; 137/625.3; 137/625.37; 251/121; 251/267; 251/282; 251/324
[58] Field of Search ............. 137/315, 454.5, 454.6, 137/454.2, 625.3, 625.37; 251/84, 121, 205, 266, 267, 282, 324, 325

[56] References Cited

U.S. PATENT DOCUMENTS

| | | | |
|---|---|---|---|
| 1,916,738 | 7/1933 | Miller et al. | 251/267 |
| 2,432,651 | 12/1977 | Bimpson | 251/266 |
| 3,327,992 | 6/1967 | Billeter et al. | 251/267 |
| 3,602,261 | 8/1971 | Brown et al. | 137/625.3 |
| 3,648,718 | 3/1972 | Curran | 137/625.37 |
| 3,704,726 | 12/1972 | Lewis | 137/625.37 |
| 4,137,934 | 2/1979 | Rice et al. | 137/454.6 |
| 4,469,123 | 9/1984 | Merrill | 137/454.6 |
| 4,503,878 | 3/1985 | Taylor | 137/454.6 |
| 4,705,071 | 11/1987 | Connors, Jr. et al. | 137/625.3 |
| 4,766,932 | 8/1988 | Heymann et al. | 137/625.37 |

FOREIGN PATENT DOCUMENTS 1561159 2/1980 United Kingdom ............ 137/454.6

Primary Examiner—George L. Walton

[57] ABSTRACT

A control valve particularly for use in a steam power plant includes a hollow valve body having a pair of aligned openings therethrough. A cylindrical valve bonnet extends through one of the openings in the valve body and is secured to the valve body. A cylindrical plug guide is secured to the end of the valve bonnet within the valve body and extends lonitudinally from the valve bonnet to the other opening in the valve body. A stationary valve seat is secured to the end of the plug guide adjacent the other opening in the valve body. A valve plug is slidably mounted in said valve guide and valve bonnet for movement toward and away from the valve seat. Actuating means extends through the valve bonnet and is connect to the valve plug for moving the valve plug into and out of engagement with the valve seat.

15 Claims, 2 Drawing Sheets

4,834,133

CONTROL VALVE

FIELD OF INVENTION

The present invention relates to an improved control valve. More particularly, the present invention relates to a control valve for use in a power plant steam system in which the plug guide and valve seat are detachably secured to the valve bonnet of the valve.

BACKGROUND OF THE INVENTION

In power plants, such as nuclear plants, steam control valves are outlined in the steam chest which is in communication with the saturated steam coming from the steam generator. The control valves in general include a valve bonnet mounted in a valve body. The valve bonnet carries an axially sliding actuator on which is a valve plug. Upon motion of the actuator, the plug slides axially upward in the valve bonnet toward and away from a valve seat. The valve seat is mounted on the valve body. When the valve plug contacts the valve seat, the valve is closed. When the valve plug is moved away from the valve seat, the valve is opened allowing a material, such as a liquid or gas, to flow through the valve. A valve of this type is shown in U.S. Pat. No. 4,705,071 to H. J. Connors, Jr. et al, issued Nov. 10, 1987 entitled "Steam Control Valve With Improved Muffler Portion," which is incorporated herein by reference. This type of control valve has a number of disadvantages which arise from the valve plug being supported on the valve bonnet while the valve seat is mounted on the valve body. Among these disadvantages are difficulties in obtaining alignment between the valve plug and valve seat, and difficulties in removing the valve seat when it becomes worn and has to be replaced. Therefore, it would be desirable to have a control valve which overcomes these disadvantages.

SUMMARY OF THE INVENTION

A control valve for a steam power plant includes a cylindrical valve bonnet having a valve plug slidably mounted therein. A valve seat is secured to an end of the valve bonnet. Actuating means is provided on the valve bonnet for moving the valve plug longitudinally in the valve bonnet toward and away from the valve seat. A valve body surrounds the valve bonnet and the valve seat. In this control valve the valve plug and valve seat are both mounted on the valve bonnet. This allows for greater ease of aligning the valve plug with the valve seat. Also, the valve seat is detachably secured to the valve bonnet to allow for greater ease of replacing the valve seat.

DETAILED DESCRIPTION OF PREFERRED EMBODIMENT

Figure 1:
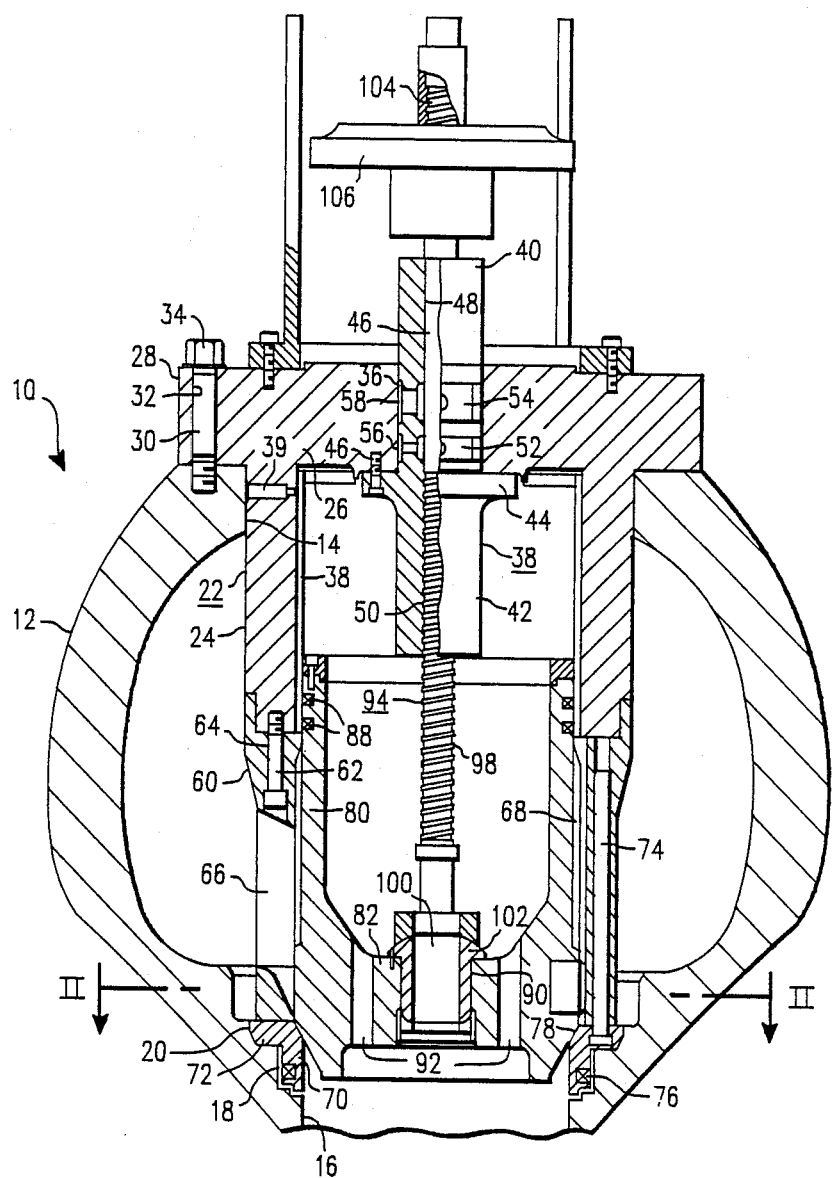
FIG. 1 is a sectional view of one form of a control valve which incorporates the present invention.
Figure 2:
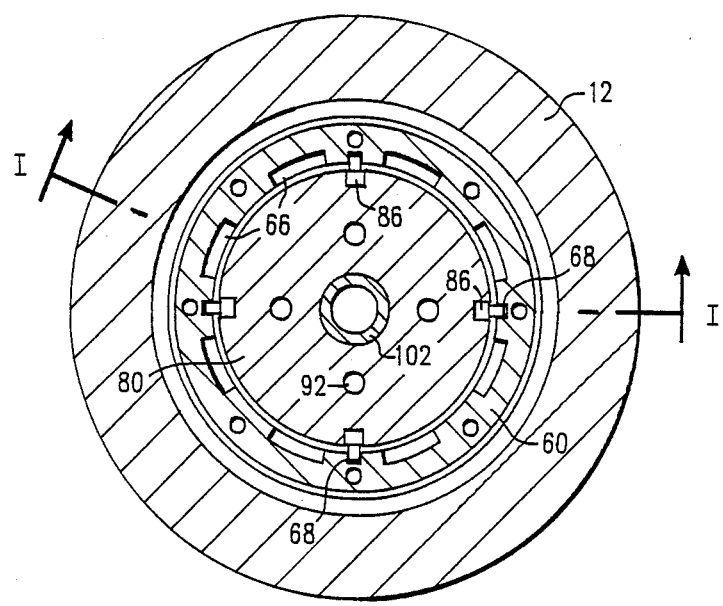
FIG. 2 is a sectional view along line 2—2 of FIG. 1.

Referring to the drawing, a control valve which incorporates the present invention is generally designated as 10. The control valve 10 may be used in the steam chest (a steam power plant as shown in U.S. Pat. No. 4,705,071. Control valve 10 includes a hollow valve body 12 which is generally spherical in shape. The valve body 12 has a top opening 14, a bottom opening 16 aligned with the top opening 12, and a side opening (not shown). A first annular recess 18 is provided in the wall of the valve body 12 adjacent the bottom opening 16, and a second annular recess 20 is provided in the valve body wall adjacent the first recess 18. The second recess 20 is larger in diameter than the first recess 18.

A valve bonnet 22 extends into the valve body 12 through the top opening 14. The valve bonnet 22 includes a cylindrical wall 24 extending longitudinally through the valve body 12, a top wall 26 across the top end of the cylindrical wall 24 and an annular flange 28 extending radially outwardly from the top wall 26. The flange 28 is seated on the top of the valve body 12. Studs 30 extend through openings 32 in the flange 28 and are threaded into the valve body 12. Nuts 34 are threaded on the ends of the studs 30 to secured the valve bonnet 22 to the valve body 12. The top wall 26 has a central opening 36 therethrough. A bearing liner 37 is shrunk fit to the inner surface of the cylindrical wall 24 and is prevented from moving by pins 39 which extend through the cylindrical wall 24 into the bearing liner 37.

A cylindrical stem guide 38 extends through the opening 36 in the top wall 26 of the valve bonnet 22. The top portion 40 of the stem guide extends through the opening 36 and projects beyond the top wall 26. The bottom portion 42 of the stem guide 38 projects longitudinally into the cylindrical wall 24 of the valve bonnet. An annular flange 44 extends radially outwardly from the stem guide 38 at the junction of the top portion 40 and bottom portion 42 and is seated against the inner surface of the top wall 26 of the valve bonnet 22. Bolts 46 extend through the flange 44 and are threaded into the top wall 26 to secure the stem guide 38 to the valve bonnet 22. Aligned passages 48 and 50 extend longitudinally through the top and bottom portions 40 and 42 respectively. The passages 48 and 50 have cylindrical surfaces. A pair of longitudinally spaced recesses 52 and 54 are provided in the wall of the top passage 48 adjacent the bottom passage 50. The recesses 52 and 54 serve as leak-offs to collect any material which may leak along the passages 48 and 50 with the recess 52 being a high pressure leak-off and the recess 54 being a low pressure leak-off. Passages 56 and 58 extend through the top portion 40 of the stem guide 38 from the recesses 52 and 54 respectively to carry away by way of passages in the bonnet flange 28, any material which may be collected in the recesses.

A cylindrical valve plug guide 60 is seated against and extends longitudinally from the bottom end of the cylindrical wall 24 of the valve bonnet 22. The plug guide 60 is secured to the cylindrical wall 24 by a plurality of short bolts 62 which extend through holes 64 in the plug guide and are threaded into the end of the cylindrical wall 24. The plug guide 60 is of a length to extend from the end of the cylindrical wall 24 to the recess 20 in the valve body 12. The plug guide 60 has a plurality of spaced windows 66 therethrough through which material can pass from the valve body 12 to the outlet opening 16 in the bottom of the valve body 12. The plug guide 60 also has a plurality of longitudinally extending guide slots 68 in its inner surface and spaced circumferentially there around.

A cylindrical stationary valve seat 70 has an annular flange 72 projecting radially outwardly from it upper end. The flange 72 is seated against the bottom end of the plug guide 60, and is secured to the plug guide 60 by a plurality of long bolts 74 which extend through the flange 72, a portion of the plug guide 60 and are threaded into the plug guide 60. The flange 72 of the valve seat 70 is inside the recess 20 in the valve body 12 with the valve seat extending into the recess 18. A pressure sealing ring 76 is provided between the valve seat 70 and the wall of the recess 18. The valve seat 70 has a spherical seating surface 78 at the top end of its inner surface.

A cylindrical valve plug 80 has a bottom wall 82 there across and slidably fits within the cylindrical wall 24 of the valve bonnet 22 and the valve guide 60. The valve plug 80 is of a length greater than the length of the valve guide 60. The valve plug 80 has a spherical radius seating surface 84 at it bottom end which is adapted to mate with the seating surface 78 of the valve seat 70. A plurality of guide keys 86 project radially outwardly from the valve plug 80 with each guide key slidably fitting into a separate guide slot 68 in the plug guide 60. This prevents relative rotation between the valve plug 80 and the valve guide 60 while allowing the valve plug 80 to move longitudinally with respect to the valve guide 60 and valve bonnet 22. Adjacent the upper end of the valve plug 80, a pair of sealing rings 88 are provided between the valve plug 80 and the bearing liner 37 in the valve bonnet 22. The bottom wall 82 of the valve plug 80 has a central hole 90 therethrough and a plurality of pressure balancing openings 92 therethrough around and spaced from the central hole 90.

An actuating stem 94 extends through the stem guide 38 and into the valve plug 80. The upper portion 96 of the actuating stem 94 is cylindrical and has a bearing fit in the top portion 40 of the stem guide 38. The lower portion 98 of the actuating stem 94 has a spiral groove therein and slides in the bottom portion 42 of the stem guide 38. The bottom end 100 of the actuating stem 94 fits into the central hole 90 in the valve plug 80 and is secured to the valve plug 80 by a fitting 102 which allows relative rotation between the actuating stem 94 and the valve plug 80, but prevents relative longitudinal movement therebetween. The top end 104 of the actuating stem 94 projects beyond the top portion 40 of the stem guide 38. A longitudinal movable spring seat 106 surrounds the top end 104 of the actuating stem 94 and is connected to spherical washer 107 by screws 109 which permit motion of the actuating stem 94 by the spring seat 106. The actuating stem 94 can also be coupled to other means, such as a motor, to cause movement of the actuating stem 94.

In the operation of the valve 10, motion of the actuating stem 94 by the spring seat 106 or any other means, causes the actuating stem 94 to move longitudinally with respect to the valve bonnet 22. This, in turn, causes the valve plug 80 to move longitudinally with respect to the valve bonnet 22 to move the valve plug 80 toward and away from the valve seat 70. When the seating surface 84 of the valve plug 80 is moved into engagement with the seating surface 78 of the valve seat 70, the valve 10 is closed and nothing will flow through the valve 10. When the seating surfaces 84 and 78 are separated, the valve 10 is opened and material, such as steam, will flow into the valve body 12 around the valve bonnet 22 through the inlet opening, not shown, in the valve body 12, through the windows 66 in the valve guide 60 and out through the outlet opening 16 in the bottom of the valve body 12.

In the control valve 10 of the present invention, the stationary valve seat 70 and the valve plug 80 are both secured to the valve bonnet 22. This allows for greater ease of aligning the seating surfaces 78 and 84 of the valve seat 70 and valve plug 80 respectively prior to completely assembling the valve 10. Also, if the valve seat 70 becomes worn and requires repair or replacement, it is only necessary to remove the valve bonnet 22, which also removes the valve seat 70, and the valve seat 70 can then be easily removed from the valve bonnet by removing the bolts 74 to repair or replace the valve seat 70. Thus, there is provided by the present invention a control valve in which the stationary valve seat can be easily aligned with the movable valve plug and which can be easily removed for repair or replacement.

I claim as my invention:

1. A control valve for a steam power plant comprising:
    a cylindrical valve bonnet;
    a cylindrical plug guide extending longitudinally from the end of the valve bonnet and secured to said valve bonnet by a plurality of short bolts extending longitudinally through a portion of the plug guide and threaded into the end of the valve bonnet;
    a valve plug slidably mounted in said plug guide and valve bonnet;
    a valve seat secured to the end of the plug guide by a plurality of long bolts extending longitudinally through the valve seat and a portion of the plug guide and threaded into the plug guide so that the plug guide and valve seat can be removed as a single unit;
    means for moving said valve plug longitudinally in said valve bonnet and plug guide toward and away from the valve seat; and
    a hollow valve body surrounding the valve bonnet, plug guide and valve seat.

2. A control valve in accordance with claim 1 in which the valve body has a pair of aligned openings therethrough, the valve bonnet extends through one of said openings and is secured to said body adjacent said one opening, and the valve seat is adjacent the other of said openings.

3. A control valve in accordance with claim 2 in which the valve seat and valve plug have spherical radius seating surfaces which mate to close said valve.

4. A control valve in accordance with claim 3 in which said plug guide has at least one window through which material flows from the valve body to said other opening in the valve body when the valve plug is away from the valve seat.

5. A control valve in accordance with claim 4 in which the plug guide has a plurality of spaced, longitudinally extending guide slots in its inner surface and the valve plug has a plurality of guide keys projecting radially outwardly therefrom with each of said guide keys slidably fitting into a separate one of said guide slots to prevent relative rotation between the valve plug and the plug guide but allow relative longitudinal movement therebetween.

6. A control valve in accordance with claim 5 in which the valve seat has a cylindrical portion and an annular flange extending radially outwardly from an end of the cylindrical portion, said flange being seated against the end of the plug guide and the bolts extend through the flange.

7. A control valve in accordance with claim 6 in which the valve body has a first annular recess in its inner surface adjacent the other opening therethrough and a second annular recess in its inner surface adjacent the first recess, the cylindrical portion of the valve seat is in the first recess and the flange of the valve seat is in the second recess, and a sealing ring is between the cylindrical portion of the valve seat and the surface of the first recess.

8. A control valve in accordance with claim 7 in which the valve bonnet has a wall across its end adjacent the one opening in the valve body, an annular flange extends radially from the wall and is seated on the valve body, and the flange is bolted to the valve body to secure the valve bonnet to the valve body.

9. A control valve in accordance with claim 8 including a stem guide extending through the center of the wall of the valve bonnet and secured to the valve bonnet, and the means for moving said plug valve is supported by said stem guide.

10. A control valve in accordance with claim 9 in which the means for moving said plug valve includes an actuating stem extending through a passage in said stem guide with one end of the actuating stem being secured to said plug valve.

11. A control valve in accordance with claim 10 in which the surface of the passage in the stem guide is smooth and a portion of the actuating stem has a spiral groove and is connected to the coupling by a threaded connection.

12. A control valve in accordance with claim 11 in which the valve plug has a wall there across and the end of the actuating stem is secured in an opening in said wall so as to permit relative rotation between the actuating stem and the plug valve but prevent relative longitudinal movement therebetween.

13. A control valve in accordance with claim 12 in which the other end of the actuating stem extends out of and beyond the valve bonnet and means for moving said actuating stand is coupled to said actuating stem.

14. A control valve for a steam power plant comprising:

a hollow valve body having an inlet and an outlet;
a cylindrical valve bonnet in said housing;
a cylindrical plug guide extending from an end of said bonnet within said housing and secured to said bonnet by a plurality of short bolts extending longitudinally through a portion of the plug guide and threaded into the end of the valve bonnet, said plug guide having an opening therethrough in communication with the inlet of said valve body and a free open end in communication with the outlet of said valve body;
a valve seat secured to the free open end of the plug guide between the end of the plug guide and the outlet of the valve body by a plurality of long bolts extending longitudinally through the valve seat and a portion of the plug guide and threaded into the plug guide so that the plug guide and valve seat can be removed as a single unit.

15. In a steam power plant system a control valve for controlling the flow of the steam comprising:

a hollow valve body having a steam inlet at one side and a steam outlet at one end;
a cylindrical valve bonnet in said housing;
a cylindrical plug guide extending from an end of said valve bonnet toward said steam outlet and secured to said valve bonnet by a plurality of short bolt extending longitudinally through a portion of the plug guide and threaded into the end of the valve bonnet, said plug guide having an opening therethrough in communication with the interior of the valve body;
a valve seat secured to the end of the valve guide by a plurality of long bolts extending longitudinally through the valve seat and a portion of the plug guide and threaded into the plug guide and located at said steam outlet in the valve body so that the plug guide and valve seat can be removed as a single unit;
a valve plug slidably mounted in said plug guide; and
means for moving said valve plug into and out of engagement with the valve seat to control the flow of steam through said valve.

* * * * *